United States Patent
McNally et al.

(10) Patent No.: US 6,675,524 B2
(45) Date of Patent: Jan. 13, 2004

(54) SPINNER BAIT SYSTEM

(76) Inventors: Alicia McNally, 8405 Jacob Dr., Cordova, TN (US) 38018; Robert R. Rickard, 5103 Fox Chase Dr., St. Charles, MO (US) 63301

( * ) Notice: Subject to any disclaimer, the term of this patent is extended or adjusted under 35 U.S.C. 154(b) by 0 days.

(21) Appl. No.: 10/202,143

(22) Filed: Jul. 23, 2002

(65) Prior Publication Data

US 2003/0019146 A1 Jan. 30, 2003

Related U.S. Application Data

(60) Provisional application No. 60/308,220, filed on Jul. 27, 2001.

(51) Int. Cl.[7] ............................................. A01K 85/10
(52) U.S. Cl. ..................... 43/42.13; 43/42.14; 43/42.15
(58) Field of Search ..................... 43/42.11, 42.13, 43/42.14, 42.15, 42.16, 42.17, 42.18, 42.19; D22/129

(56) References Cited

U.S. PATENT DOCUMENTS

| | | | | |
|---|---|---|---|---|
| 354,721 A | * | 12/1886 | McHarg | 43/42.17 |
| 465,704 A | * | 12/1891 | Skinner | 43/42.19 |
| 480,132 A | * | 8/1892 | Pflueger | 43/42.19 |
| 520,594 A | * | 5/1894 | Harlow | 43/42.19 |
| 1,874,883 A | * | 8/1932 | Brown | 43/42.14 |
| 2,674,823 A | * | 4/1954 | Gellings | 43/42.19 |
| 2,821,044 A | * | 1/1958 | Bateman | 43/42.16 |
| 2,886,913 A | * | 5/1959 | Stanley | 43/42.19 |
| D214,898 S | * | 8/1969 | Turbeville | D22/129 |
| 3,541,720 A | * | 11/1970 | Buffett | 43/42.19 |
| 3,750,325 A | * | 8/1973 | Feltman | 43/42.14 |
| 3,766,682 A | * | 10/1973 | Majdak | 43/42.14 |
| 3,996,688 A | * | 12/1976 | Hardwicke, III | 43/42.11 |
| 4,011,681 A | * | 3/1977 | Johnson | 43/42.11 |
| 4,033,065 A | * | 7/1977 | Shannon | 43/42.13 |
| 4,035,945 A | * | 7/1977 | Newman | 43/42.15 |
| 4,133,135 A | * | 1/1979 | Miles | 43/42.13 |
| 4,551,940 A | * | 11/1985 | East | 43/42.13 |
| 4,638,586 A | * | 1/1987 | Hall | 43/42.13 |
| 4,718,191 A | * | 1/1988 | Gentry | 43/42.13 |
| 4,794,721 A | * | 1/1989 | Rowe et al. | 43/42.13 |
| 4,881,341 A | * | 11/1989 | Dickey et al. | 43/42.12 |
| 4,891,901 A | * | 1/1990 | Baker, Jr. | 43/42.13 |
| 5,058,309 A | * | 10/1991 | Firmin | 43/42.13 |
| 5,226,253 A | * | 7/1993 | Daniel et al. | 43/42.13 |
| 5,355,612 A | * | 10/1994 | Smith | 43/42.13 |
| 5,381,621 A | * | 1/1995 | Fuller | 43/42.13 |
| 5,499,470 A | * | 3/1996 | Reed | 43/42.13 |
| 5,605,004 A | * | 2/1997 | Boullt et al. | 43/42.13 |
| 5,647,163 A | * | 7/1997 | Gorney | 43/42.13 |
| 5,956,887 A | * | 9/1999 | Mostovsky | 43/42.19 |
| 5,974,723 A | * | 11/1999 | Taibi | 43/42.13 |
| 6,108,961 A | * | 8/2000 | Milawski et al. | 43/42.13 |
| 6,158,162 A | * | 12/2000 | Loniello | 43/42.13 |
| 6,173,521 B1 | * | 1/2001 | Rockhill, Jr. | 43/42.13 |

FOREIGN PATENT DOCUMENTS

| | | | | | |
|---|---|---|---|---|---|
| CA | 467809 | B1 | * | 9/1950 | 43/42.19 |
| FR | 848036 | B1 | * | 10/1939 | 43/42.17 |
| FR | 2248789 | B1 | * | 5/1975 | 43/42.17 |
| FR | 2739752 | B1 | * | 4/1997 | |
| JP | 2002-65116 | B1 | * | 3/2002 | |
| JP | 2002-291377 | B1 | * | 10/2002 | |

* cited by examiner

*Primary Examiner*—Darren W. Ark
(74) *Attorney, Agent, or Firm*—Wyatt, Tarrant & Combs, LLP

(57) ABSTRACT

An improved spinner bait features a unique double trailer (blade attachment) arrangement. The trailers attach, one behind the other, to a stiff wire leader with jig head. Each trailer features a clevis mounted spinner blade, a bearing bead mounted behind the spinner blade and a sleeve. Each trailer has a detachable latch for securing it to the wire leader/jig head or to another trailer.

19 Claims, 4 Drawing Sheets

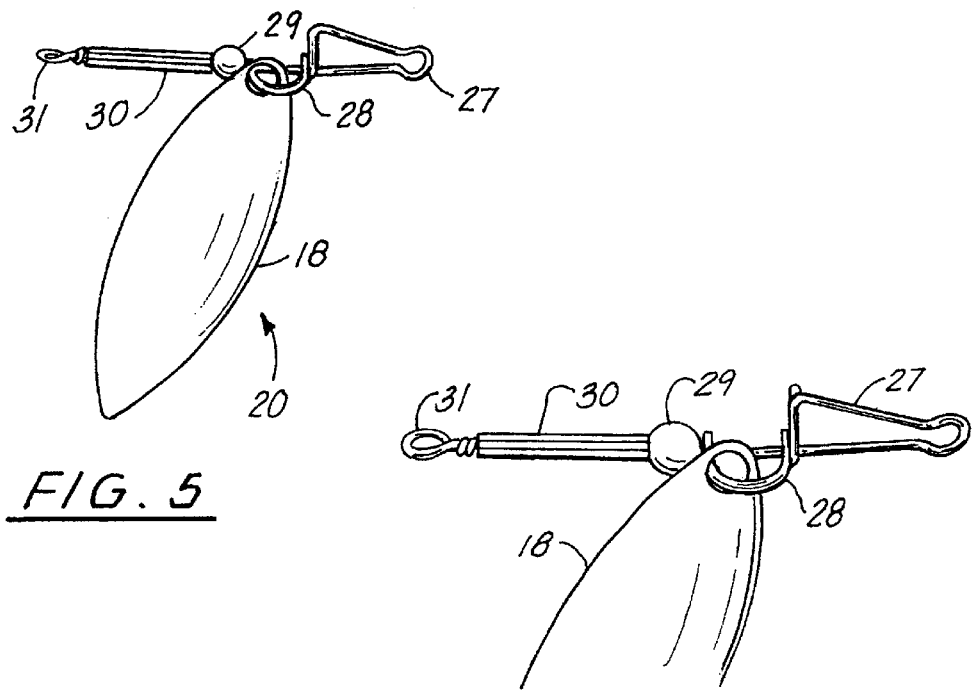
FIG. 5
FIG. 6
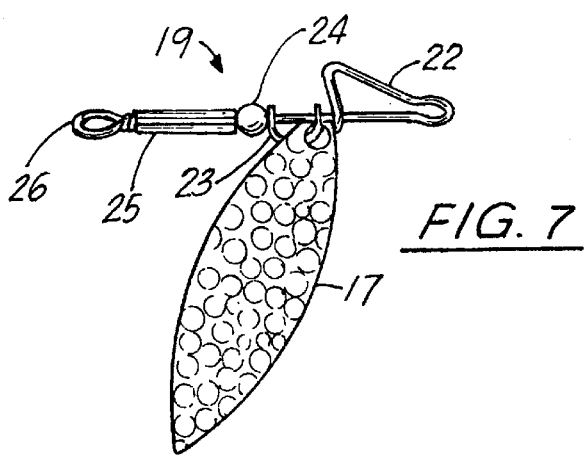
FIG. 7

SPINNER BAIT SYSTEM

CROSS-REFERENCE TO RELATED APPLICATIONS

This application claims priority under 35 USC 19(e) to U.S. Provisional Patent Application Ser. No. 60/308,220 that was filed on Jul. 27, 2001, which is incorporated herein by reference in its entirety.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to fishing lures and more particularly to an improved spinner bait fishing lure that provides a wire leader, hook, and double trailer-spinner arrangement of improved configuration.

2. General Background of the Invention

Fishermen employ a number of different types of lures. One of the most common types of lures is known as a spinner bait. Spinner baits typically include a hook or jig portion mounted to a stiff wire leader and opposite a metallic spinner. The spinner is typically provided with a silver or gold mirror finish and spins during use.

A number of patents have issued for fishing lures that employ spinner blades. Early patents include the Harlow patent entitled "Trolling Spoon", U.S. Pat. No. 520,594, and the Stanley U.S. Pat. No. 2,886,913.

The Gellings U.S. Pat. No. 2,674,823 shows a "spinner fish lure" that includes a spinner blade mounted upon a clevis and having a locking clasp that enables a hook to be removably attached thereto.

The Daniel U.S. Pat. No. 5,226,253 discloses a spinner bait lure having a wire shaft, upon which a spinning element and fish hooks are mounted, having the wire shaft part thereof coated with a low surface friction and low water wetting material such as those included in the group containing polytetrafluoroethylene and hexafluoropropylenes. The coating provides improved spinner action and provides more animated movement of the lure in the water.

The Feltman U.S. Pat. No. 3,750,325 discloses a fishing lure comprising a serial connection, a relatively stiff axial lead shaft having a keel-weighted principal body member and an upper fin, a spinner blade and a trailing hook, all connected together as to preclude any substantial relative rotation as between the lead shaft body and trailing hook. The lure includes in a preferred embodiment a spinner carried by a wire strut extending vertically up from said principal stiff shaft, said strut carrying a freely spinnable blade, all constructed and arranged with the upper spinner spoon situated generally vertically above the principal body member.

The Buffett U.S. Pat. No. 3,541,720 discloses fishing spoons that include a spinner blade mounted upon a clevis to a linear wire member.

The East U.S. Pat. No. 4,551,940 discloses a spinner bait that includes a pair of fish hooks secured together in a generally V-shaped configuration and at an angle of approximately 45 degrees. Each of the fish hooks is of conventional design and comprises a barbed hook and a wire lead integrally connected thereto and terminating in a connecting eye. A lead sinker is positioned on the wire lead of the first fish hook proximate the barbed hook. A spinner blade is rotatably secured to the barbed hook of the second fish hook. In an alternative embodiment, a flexible skirt of plastic or rubber streamers is additionally provided on the wire lead of the first fish hook proximate the barbed hook and is configured so as to partially conceal the hook. Once coupled together, the fish hooks are constrained to move in concert and are not free swinging and are arranged so that the arcuate portions of their respective barbed hooks face each other. In another alternative embodiment, the two fish hooks are integrally formed from a single piece of wire.

The Hall U.S. Pat. No. 4,638,586 discloses an improvement in lure elements of fishing lures including spinner baits and jig baits.

Two of the most successful spinning lure designs include two commercially available designs, the over-arm spinner, hereafter referred to as a conventional spinner bait, and the in-line spinner.

BRIEF SUMMARY OF THE INVENTION

The lure of the present invention provides an improved spinner bait having one or more spinner blades wherein each spinner blade is mounted on an individual, universal application trailer or "blade attachment" consisting of a spinner blade mounted upon a clevis, which in turn is threaded on a dedicated wire shaft and ahead of a bead that is used as a bearing surface.

The shaft terminates behind the bead with a wrapped loop provided in the wire leader that serves as a stop for the mounted components.

Between the bead and end loop, a dedicated spacer of a carefully calculated length, (based on the physical size and performance characteristics of the spinner blade being used), is inserted to prevent the spinner blade from interfering with the free rotation and performance of any blade being used behind the subject blade. The end loop serves as the connecting point for attaching subsequent trailer/blade attachments in series. A specially configured locking clip is formed in the wire of each blade attachment and located at the front of the blade/clevis/bead/spacer/loop assembly. This locking clip is used to attach the trailer or "blade attachment" to the lure body or another already attached blade attachment.

The spinner bait of the present invention (in contrast to existing conventional spinner baits) does not use spinner blades mounted directly on the upper arm or on any other part of the lure body. Because of the inherent and necessary basic design configuration of the spinner bait lure bodies and the introduction of physical forces affecting the lure while being retrieved (such as gravity, water pressure, retrieve force, and speed, etc.), the lure body does not provide any axis for rotation. The lure is always perfectly perpendicular to the direction of the retrieve.

The blade attachments featured and utilized exclusively by the present invention, spinner baits are held perfectly perpendicular to the direction of travel by water pressure, and provide much more efficient startup rotation than conventional spinner baits and provide continued rotation at much lower retrieve speeds than do conventional spinner baits.

The present invention spinner bait, in contrast to existing conventional spinner baits, does not use swivels to attach spinner blades behind the upper arm of the lure body.

For a swivel to be utilized on a conventional spinner bait, it must by the necessity of the design of the lure, be kept as small in size as possible. This minimally affects the overall size of the lure assembly. Because of the complexity of the composition of a swivel (they should contain extremely small ball bearings to function best) they are inherently delicate, which proves to be a major problem in conventional spinner bait lures because of the stresses and abuses received by the swivel while being used.

The most common mechanical problem with currently available conventional spinner bait is swivel failure, wherein the swivel binds and will not permit the blade to rotate at all. Swivels are user-replaceable, but swivels of adequate quality for conventional spinner bait use are expensive. The physical act of changing the swivel is complicated and time consuming. The tools and mechanical ability to successfully perform the replacement are not always available to average consumers.

A spinner blade flopping in a rotary direction on the end of a swivel mounted to the upper arm of the lure body produces a specific sonic signature that many species of fish find very attractive.

A spinner blade mounted on a clevis on an in-line spinner which is attached directly to, and in line with (and vectored in the same direction as) the line produces a different sonic signature that appeals to many of the same species of fish as a swivel-mounted blade, and also to some others that are not attracted to the sound produced by a swivel-mounted blade.

The present invention spinner bait adds a third distinct sonic signature to the equation. It features a clevis-mounted spinner blade rotating on a wire shaft like an in-line spinner. This clevis mounted spinner is freely-mounted to either the upper part of the lure body, or to another blade attachment, behind which it will float while in motion much like a swivel. The resulting sound combines most of the sound characteristics of both conventional spinner bait and in-line spinners while adding some of its' own unique characteristics. The result demonstrates a very favorable attraction to all of the species attracted to either and both types of existing lures, and additional strong attraction to species not particularly attracted to the either of the originals. An example is that the present invention spinner bait is producing excellent catches of Walleye, a species not known to be particularly attracted to spinner type lures. The present intention spinner bait is also demonstrating itself to be superior to existing conventional spinner baits and in-line spinners in attracting both Muskie and Pike. On all other species of fish attracted to spinner type lures, the present invention spinner bait has proven to be superior in catching these fish.

Individual quick change interchangeable blades provide major user and performance benefits. Successful fishing requires the ability of the angler to be able to present a variety of configurations of each artificial lure type to match the feeding mood of the quarry at that particular time. These configurations can vary in visual varieties (differing colors, sizes and shapes), physical performance and sonic varieties (for fast retrieves, slow retrieves, shallow retrieves, deep retrieves, quiet retrieves, noisy retrieves), etc.

While there are theoretically an infinite number of head sizes available, there are only nine sizes normally sold for bass fishing: ⅛, ¼, ⅜, ½, ¾, 1, 1½, 2, and 2½ ounces. Of these, most fishermen only carry five because of space, weight and economic restrictions (⅛, ¼, ⅜, ½, and ¾ ounce).

The main variable in any spinner bait selection are the spinner blades, which are the primary attractors of the lures. Experts agree that conditions usually dictate the use of only one blade about half the time, and two or more blades per lure the rest of the time. There are many different types of blades available for use, but for economic and handling reasons only four basic types of spinner blades are normally used on all spinner baits: Colorado, Indiana, Willowleaf and Turtleback (also called Oklahoma or Magnum Willowleaf). Applicable sizes used vary by type, and are eight for Colorado (#1, #1.5, #2, #3, #3.5, #4, #5, and #6), six for Indiana (#2, #3, #4 #5, #6, and #7), eight for Willowleaf (#3, #3.5, #4, #4.5, #5, #6, and #7) and four for Turtleback (#3, #4, #5 and #6). These blades are each available in many finish textures, but for economic reasons only four are normally used: smooth, hammered, diamond and fluted.

Blade colors are normally restricted to only seven for most spinner bait use: nickel, gold, brass, copper, white, black and chartreuse.

To summarize the staggering number of individual lure configurations potentially available based only on the limited variables above, simply multiple the five head sizes listed above by the six skirt patterns (=30) by four blade types (=120) by twenty eight specific blade sizes (=3,360) by four available finishes per blade (=14,440) by the seven limited colors listed per blade and you get a preposterous total of at least 94,080 justifiable lures required for a hypothetical complete selection of conventional spinner baits (which requires an individual lure for each configuration), which at an average weight of ⅜ oz. each would weigh a staggering 2,205 lbs. While unrealistic in actual practice but the example provides an accurate illustration of the vast amounts of weights, space and consumer investment savings provided by present invention spinner baits over conventional spinner baits.

As evidenced by the fact that they are the largest selling and most universally used fishing lures in the world, in-line spinners are successful fish catchers. But it is also universally agreed that the weaknesses of in-line spinners are their susceptibility to severe and damaging line twist (conventional spinners offer nothing usually distending on the lure to adequately serve as a "keel" to prevent the entire lure from rotating in the water) and there exist inherent difficulties in making them weedless and snagless. Unlike the overarm of any spinner bait, there is usually nothing on an in-line spinning lure to protect the hook (the use of "weedless hooks" is avoided on these lures because of poor hooking qualities). These weaknesses greatly restrict the use of in-line spinners to clear, open water.

On an in-line spinner, the blade(s) are clevis mounted, in line, on the same wire shaft that holds all other components, and are always positioned perpendicular to the direction of travel while the lure is in motion. This provides very efficient startup rotation and also facilitates continued rotation at very low retrieve speeds. Unlike conventional spinner baits, which meet none of these goals, the present invention spinner bait maintains these virtues.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 5 is a fragmentary view of the preferred embodiment of the apparatus of the present invention illustrating the first trailer and its spinner blade;

FIG. 6 is a partial perspective view of the preferred embodiment of the apparatus of the present invention illustrating the first trailer and its spinner blade;

FIG. 7 is a partial perspective view of the preferred embodiment of the apparatus of the present invention illustrating the second trailer and its spinner blade;

DETAILED DESCRIPTION OF THE INVENTION

Figure 1:
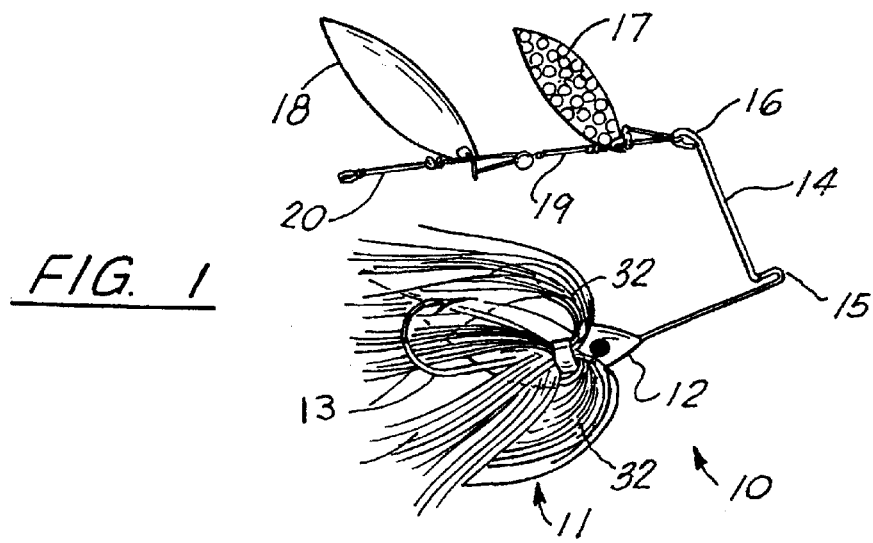
FIG. 1 is a perspective view of the preferred embodiment of the apparatus of the present invention.
Figure 2:
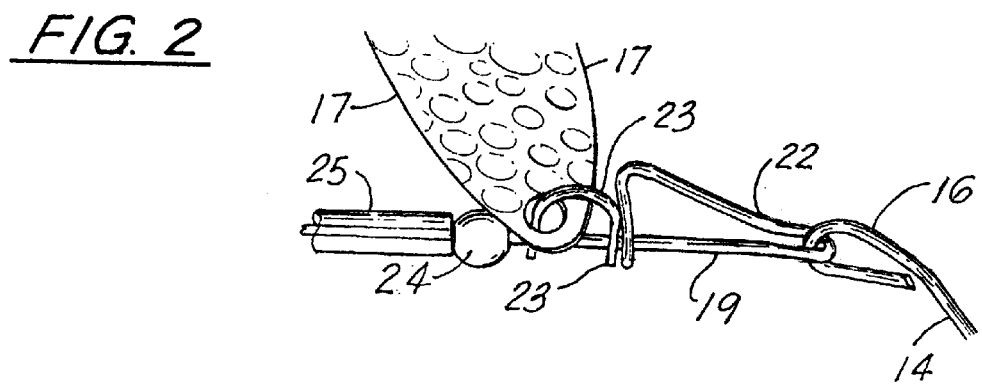
FIG. 2 is a fragmentary view of the preferred embodiment of the apparatus of the present invention.
Figure 3:
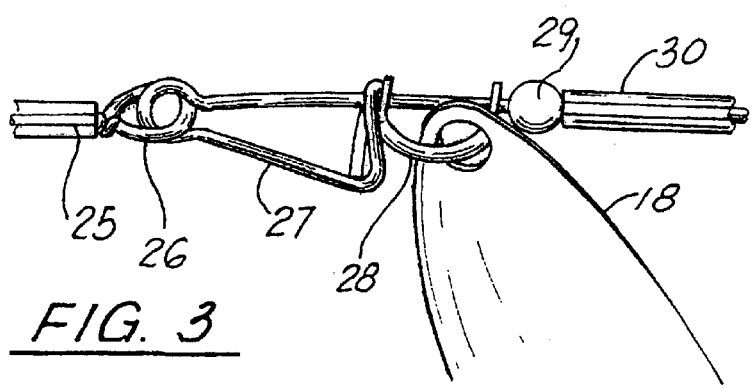
FIG. 3 is a fragmentary view of the preferred embodiment of the apparatus of the present invention.
Figure 4:
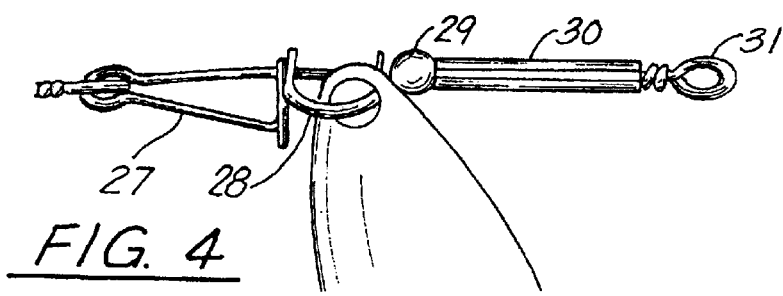
FIG. 4 is a fragmentary view of the preferred embodiment of the apparatus of the present invention.

FIGS. 1–7 show the preferred embodiment of the apparatus of the present invention designated generally by the numeral 10 in FIG. 1. Fishing lure 10 includes a wire leader 14 that supports a jig head 11, including a hook portion 13 and head portion 12. The wire leader 14 has a bend section 15 to which a fisherman attaches his or her fishing line during use. Wire leader 14 provides an eyelet 16 generally opposite hook 13.

First trailer 19 defines a blade attachment that removably attaches to eyelet 16 using locking clasp 22. The first trailer 19 includes a first spinner blade 17 mounted upon a clevis 23. The first trailer 19 also carries bead 24, sleeve 25, and has a rear eyelet 26. Bead 24 functions as a bearing for clevis 23. A second trailer 20 defines a blade attachment that can be removably connected to the first trailer 19 at eyelet 26 using locking clasp 27. Second trailer 20 has a clevis 28 that carries second spinner blade 18, as shown in FIG. 5. Second trailer 20 has locking clasp 27, clevis 28, bead 29, sleeve 30 and a rear eyelet 31 (see FIG. 4). Bead 29 functions as a bearing for clevis 28. The lure 10 can be fitted with a skirt 32 if desired, by attaching the skirt to jig head 11.

Figure 9:
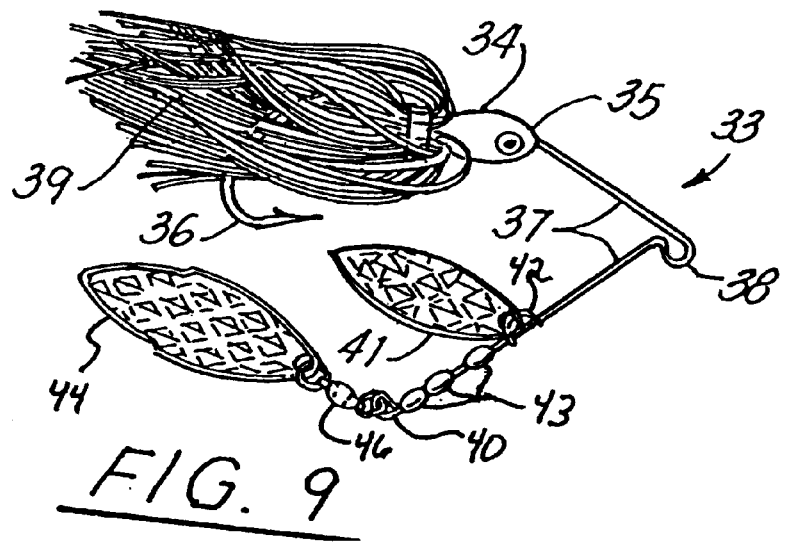
FIG. 9 is another perspective view of the second embodiment of the apparatus of the present invention.
Figure 8:
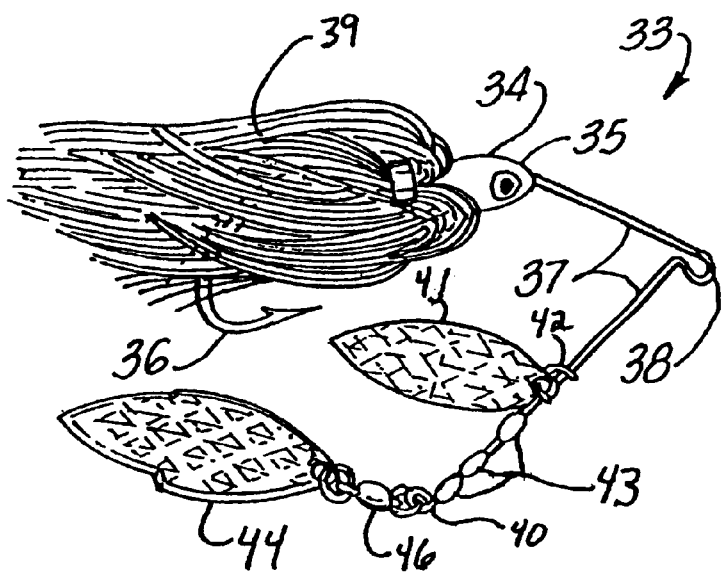
FIG. 8 is a perspective view of a second embodiment of the apparatus of the present invention.

In FIGS. 8–12, a second embodiment of the apparatus of the present invention is designated by the numeral 33. Fishing lure 33 includes a jig head 34 that has head 35 and hook 36 portions. Wire leader 37 attaches to jig head 34 at one end portion and provides an eyelet 40 at its other end portion. Bend section 38 enables a fisherman to attach his or her fishing line to the lure 33 at the bend section 38. A skirt 39 can be fitted to the lure 33 as shown in FIGS. 8 and 9.

Figure 10:
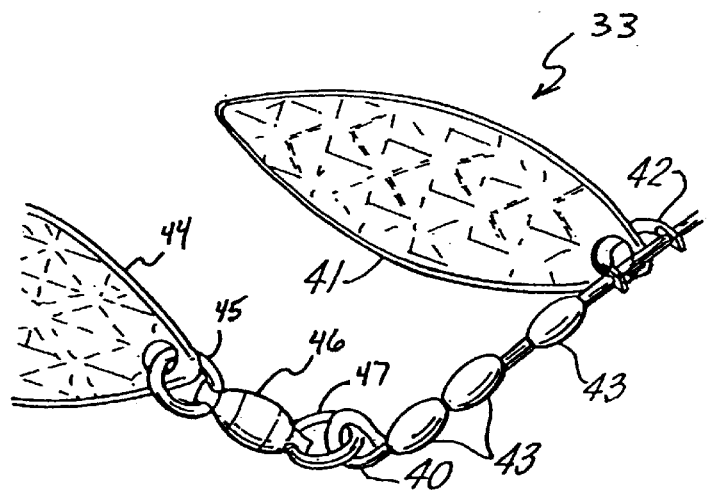
FIGS. 10–12 are fragmentary close up views of the spinner blade portions of the second embodiment of the apparatus of the present invention.
Figure 11:
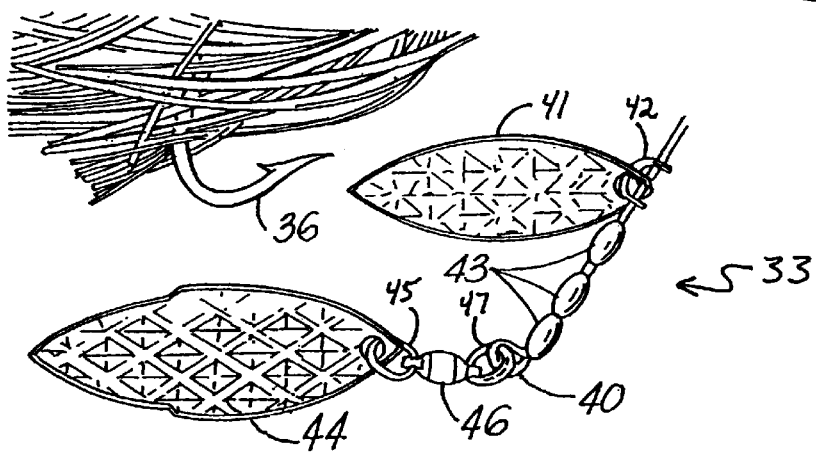
Figure 12:
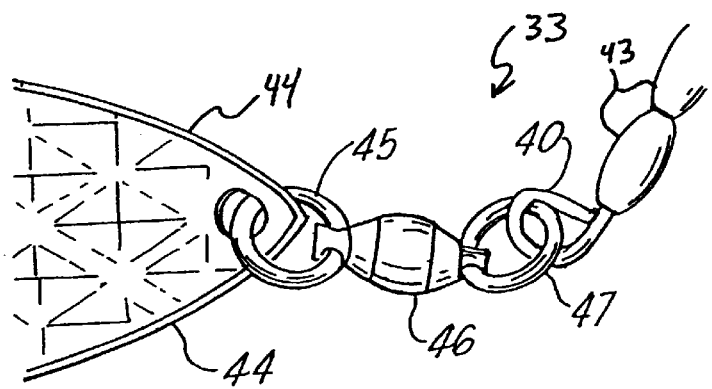

Eyelet 40 is provided for supporting ring 47, barrel swivel 46, and ring 45 as shown in FIGS. 10–12. The fishing lure 33 supports two spinner blades, including a first spinner blade 41 that is mounted in front of eyelet 40 upon clevis 42, as shown in FIG. 10. A plurality of beads 43 can be positioned in between clevis 42 and eyelet 40 as shown in FIG. 10, each bead 43 functioning as a bearing. A second spinner blade 44 is attached to ring 45 and thus to eyelet 40 via barrel swivel 46 and ring 47.

The following is a list of suitable parts and materials for the various elements of the preferred embodiment of the present invention.

| PARTS LIST | |
|---|---|
| Part No. | Description |
| 10 | fishing lure |
| 11 | jig |
| 12 | head |
| 13 | hook |
| 14 | wire leader |
| 15 | bend section |
| 16 | eyelet |
| 17 | first spinner blade |
| 18 | second spinner blade |
| 19 | first trailer |
| 20 | second trailer |
| 22 | locking clasp |
| 23 | clevis |
| 24 | bead |
| 25 | sleeve |
| 26 | eyelet |
| 27 | locking clasp |
| 28 | clevis |
| 29 | bead |
| 30 | sleeve |
| 31 | eyelet |
| 32 | skirt |

The foregoing embodiments are presented by way of example only; the scope of the present invention is to be limited only by the following claims.

What is claimed is:

1. A spinner bait, comprising:
   a) a wire leader comprising a bend section attachable to a fishing line, the wire leader comprising a jig head and an associated hook disposed at a first end portion, and an eyelet disposed at a second end portion substantially opposite of the first end portion;
   b) a first trailer attached to the eyelet of the wire leader, the first trailer comprising:
      1) a first trailer end that is releasably connected with the eyelet of the wire leader;
      2) a posterior eyelet disposed at a second trailer end of the first trailer substantially opposite of the first trailer end; and
      3) a first spinner blade attached to the first trailer;
   c) a second trailer releasably connected to the posterior eyelet of the first trailer; and
   d) a second spinner blade, a bead, and a sleeve mounted on the second trailer.

2. The spinner bait of claim 1 wherein the first trailer comprises a first bead mounted on the first trailer, wherein the first spinner blade is interconnected with the first trailer by a clevis mounted on the first trailer between the first trailer end and the first bead.

3. The spinner bait of claim 2 further comprising a first sleeve mounted on the first trailer, wherein the first bead is disposed between the first sleeve and the clevis associated with the first spinner blade.

4. The spinner bait of claim 1 wherein the second spinner blade is mounted on the second trailer via a clevis disposed at least generally between the first trailer and the bead mounted on the second trailer.

5. The spinner bait of claim 4 wherein the bead mounted on the second trailer is disposed between the clevis and the sleeve mounted on the second trailer.

6. A spinner bait, comprising:
   a) a wire leader that includes a leading portion that is attachable to a fishing line, the wire leader including at one end portion thereof a jig head having a hook and at another end portion thereof an eyelet;

b) a first trailer attached to the eyelet of the wire leader, the first trailer including an integral first locking clasp that enables a removable connection to be made with the eyelet of the wire leader, the first locking clasp comprising both a first end portion of the first trailer that extends through the eyelet of the wire leader and a bent portion that is bent back at least generally toward a second end portion of the first trailer, the first locking clasp further comprising a securing portion that is hookingly engaged about an intermediate portion of the first trailer that is located between the first and second end portions of the first trailer;

c) a first spinner blade, bead and sleeve mounted upon the first trailer, the first trailer including a posterior eyelet, the bead being positioned between the first spinner blade and the posterior eyelet;

d) a second trailer that is attached to the first trailer at the posterior eyelet, the second trailer including a second locking clasp that enables a removable connection to be made with the first trailer at the posterior eyelet; and e) a second spinner blade.

7. The spinner bait of claim 6 wherein at least one of the first and second spinner blades is mounted to the corresponding first and second trailers using a clevis.

8. The spinner bait of claim 6 wherein the sleeve is of a plastic material.

9. The spinner bait of claim 6 wherein the first locking clasp of the first trailer is in front of the first spinner blade, and the bead and sleeve are behind the first spinner blade during use.

10. The spinner blade of claim 6 wherein the first and second trailers comprise front end portions defined by the respective first and second locking clasps.

11. The spinner blade of claim 6 wherein the sleeve is about one half of a length of the first trailer.

12. The spinner bait of claim 6 wherein each of the first and second spinner blades is mounted to the corresponding first and second trailers with a clevis.

13. A spinner bait, comprising:

a) a wire leader that includes a bend section for attachment to a fishing line, the wire leader including at one end portion thereof a jig head having a hook and at another end portion thereof an eyelet;

b) a first trailer attached to the eyelet of the wire leader, the first trailer including a first locking clasp that enables a removable connection to be made with the eyelet of the wire leader;

c) a first spinner blade, bead and sleeve mounted upon the first trailer, the first trailer including a posterior eyelet;

d) a second trailer attached to the first trailer at the posterior eyelet, the second trailer including a second locking clasp that enables a removable connection to be made with the first trailer at the posterior eyelet; and e) a second spinner blade, bead and sleeve mounted upon the second trailer.

14. The spinner bait of claim 13 wherein at least one of the first and second spinner blades is mounted to the corresponding first and second trailers using a clevis.

15. The spinner bait of claim 13 wherein the sleeves are of a plastic material.

16. The spinner bait of claim 13 wherein at least one of the first and second locking clasps of the corresponding first and second trailers is disposed in front of the respective first and second spinner blades, beads and sleeves during use.

17. The spinner blade of claim 13 wherein the first and second trailers comprise front ends defined by the respective first and second locking clasps.

18. The spinner blade of claim 13 wherein each sleeve is about one half of a length of the corresponding first and second trailers.

19. The spinner bait of claim 13 wherein the first spinner blade is mounted to the first trailer with a clevis, and the second spinner blade is mounted to the second trailer with a clevis.

* * * * *

UNITED STATES PATENT AND TRADEMARK OFFICE
CERTIFICATE OF CORRECTION

PATENT NO. : 6,675,524 B2
DATED : January 13, 2004
INVENTOR(S) : Alicia McAnally and Robert R. Rickard It is certified that error appears in the above-identified patent and that said Letters Patent is hereby corrected as shown below:

<u>Title page,</u>
Item [76], Inventors, "McNally" should be replaced with -- McAnally --.

Signed and Sealed this

Sixteenth Day of March, 2004

JON W. DUDAS
*Acting Director of the United States Patent and Trademark Office*